United States Patent [19]

Pressaco

[11] Patent Number: 4,744,608
[45] Date of Patent: May 17, 1988

[54] BRAKING CORRECTOR

[75] Inventor: Pierre Pressaco, La Courneuve, France

[73] Assignee: Bendix France, Paris, France

[21] Appl. No.: 939,646

[22] Filed: Dec. 9, 1986

[30] Foreign Application Priority Data

Dec. 11, 1985 [FR] France ................. 85 18345

[51] Int. Cl.⁴ ................................. B60T 8/18
[52] U.S. Cl. .................... 303/22.5; 303/22.8; 188/195
[58] Field of Search ............... 188/195; 303/6 A, 6 R, 303/22 A, 22 R, 23 A, 23 R, 56

[56] References Cited

U.S. PATENT DOCUMENTS

| 2,408,123 | 9/1946 | Pickert | 303/22 R |
| 4,200,340 | 4/1980 | Margetts | 303/6 A |
| 4,448,457 | 5/1984 | Pressaco | 303/22 R |

FOREIGN PATENT DOCUMENTS

| 0447332 | 3/1948 | Canada | 188/195 |
| 0053528 | 6/1982 | European Pat. Off. | |
| 0072331 | 2/1983 | European Pat. Off. | |
| 0076567 | 4/1983 | European Pat. Off. | |
| 2557714 | 6/1977 | Fed. Rep. of Germany. | |
| 2655546 | 6/1978 | Fed. Rep. of Germany. | |
| 55844 | 9/1952 | France. | |
| 2367638 | 5/1978 | France. | |
| 1547785 | 6/1979 | United Kingdom. | |
| 2017243 | 10/1979 | United Kingdom. | |

Primary Examiner—Andres Kashnikow
Attorney, Agent, or Firm—Larry J. Palguta; Ken C. Decker

[57] ABSTRACT

Variable-ratio braking corrector for a vehicle, comprising a housing provided with at least two parallel bores (14, 16), at least two pistons (24, 26) one mounted slideably in each bore, the two pistons projecting from the housing and cooperating with the two ends of a rocker (28) mounted in an articulated manner relative to the housing (12), the hinge pin (48) of the rocker (28) being displaceable by means of a mechanism connected to the vehicle suspension, to vary the ratio of the corrector as a function of the vehicle load, characterized in that the corrector also comprises a reversible escape device (50) in the mechanism, comprising at least two elements (52, 58) coupled pivotably to one another, one (58) being coupled to the hinge pin (48) and the other (52) being stressed toward a rest position by a spring mechanism (60).

7 Claims, 3 Drawing Sheets

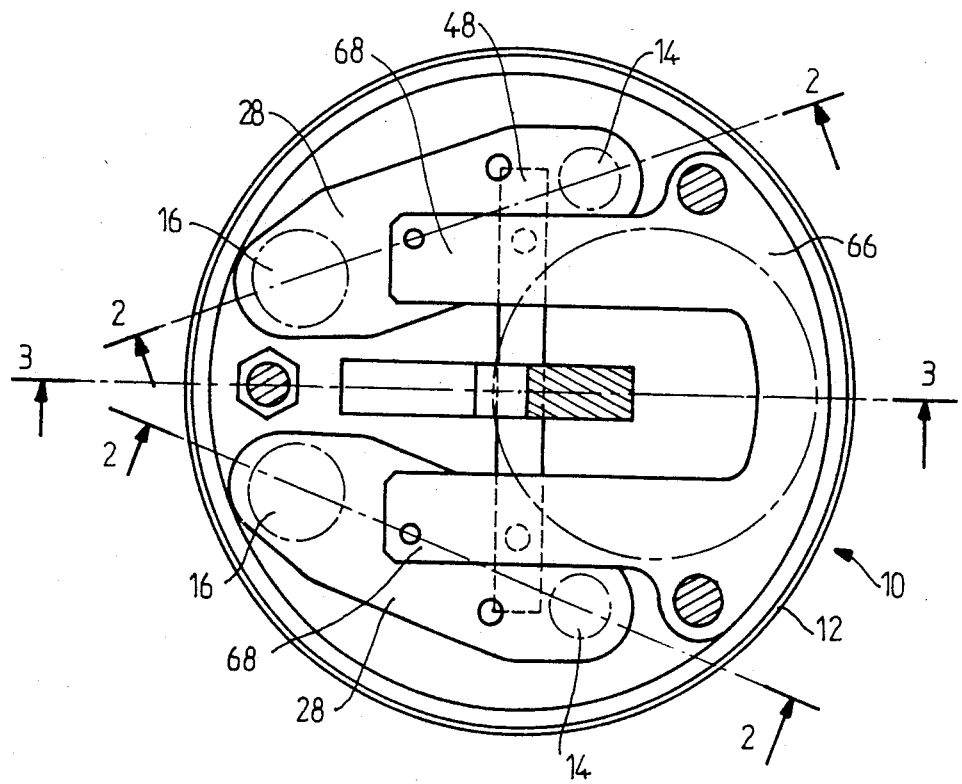
FIG_1
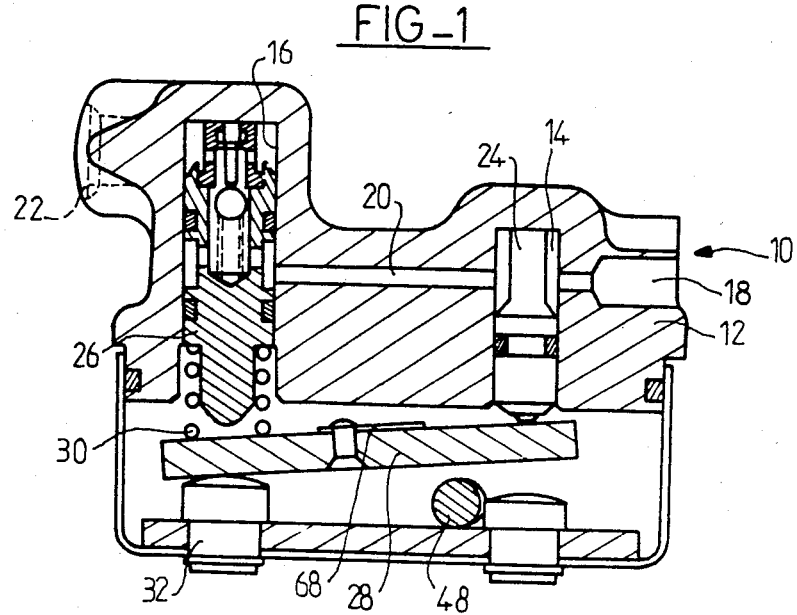
FIG_2

BRAKING CORRECTOR

The present invention relates to variable-ratio braking correctors for motor vehicles.

The first addition No. 55844 to French Pat. No. 977,052 describes a braking corrector comprising a housing provided with two parallel bores, and two pistons mounted slideably in the bores, one of the pistons delimiting in the housing an inlet chamber to be connected to a source of pressurized fluid and the other piston interacting with a valve controlling the fluid flow between the inlet chamber and an outlet chamber to be connected to at least one brake motor, the two pistons projecting from the housing and cooperating with the two ends of a rocker mounted in an articulated manner on the housing, the hinge pin being movable as a function of the vehicle load.

The disadvantage of this device is that, during sharp braking, the hydraulic pressure acting on the rocker tends to lock the hinge pin, thus impeding the displacement of the mechanism connected to the vehicle suspension. If the vehicle suspension is also subjected to a shock or a jolt, during sharp braking the mechanism, which does not have complete freedom of movement, risks being seriously damaged.

It is therefore an object of the present invention to provide a variable-ratio braking corrector of the above type, which avoids the above-mentioned disadvantages by including a reversible escape device in the mechanism.

According to the invention there is provided a variable-ratio brake corrector which also comprises a reversible escape device, the mechanism comprising at least two elements coupled pivotably to one another, one being coupled to the hinge pin and the other being stressed towards a rest position by a spring means.

The invention will now be described by way of example with reference to the accompanying drawings in which:

FIG. 1 is a sectional view of a braking corrector according to the invention taken along the sectional plane I—I of FIG. 3;

FIG. 2 is a sectional view of FIG. 1 along one of the lines 2—2 (the two sectional lines being identical)

Figure 3:
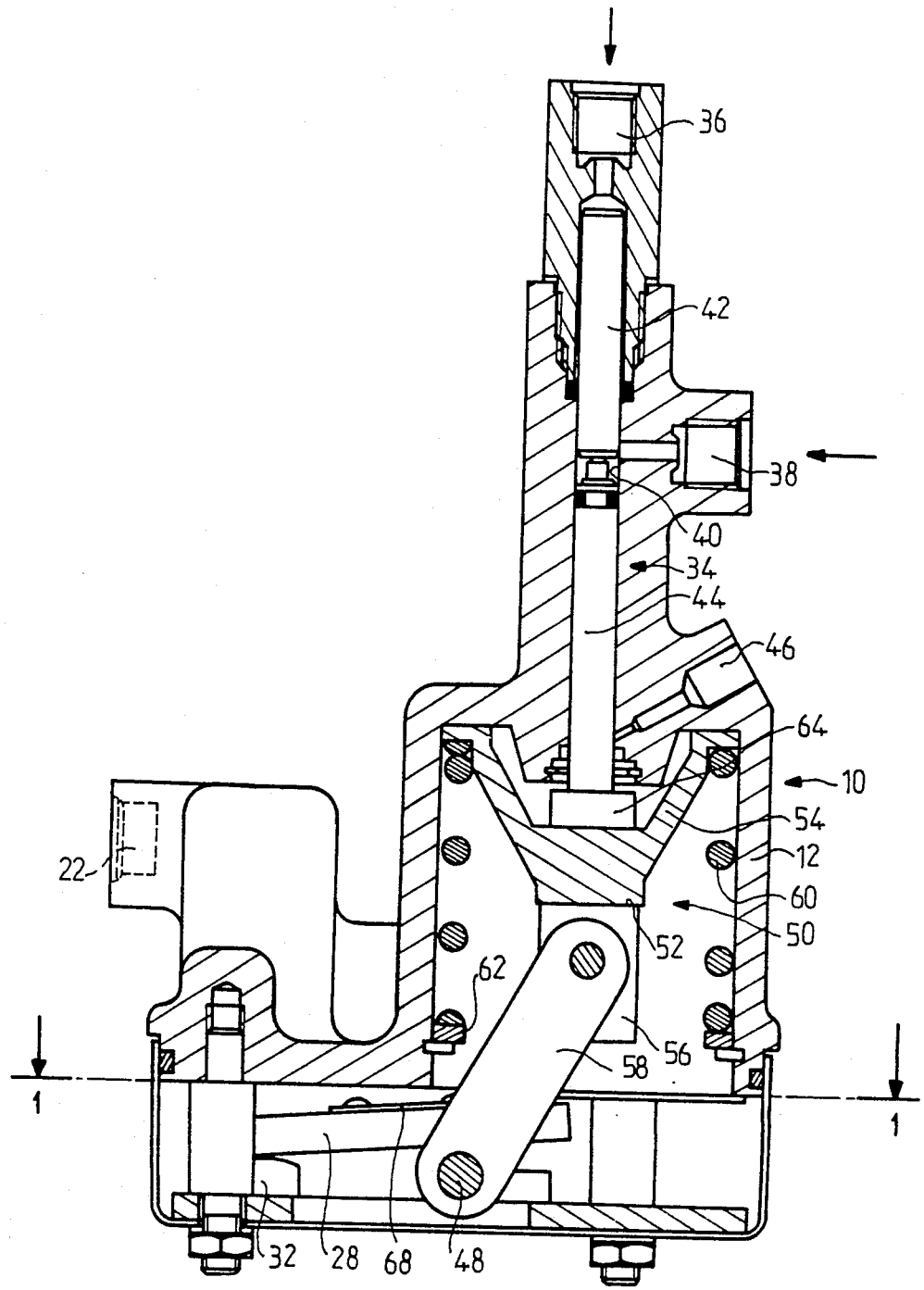
FIG. 3 is a sectional view of the corrector of FIG. 1 along the line 3—3.

As shown in the Figures, a braking corrector 10, a double corrector in the example illustrated, comprises a housing 12 having two identical pairs of parallel blind bores 14 and 16. An inlet orifice 18 communicates respectively with the bore 14 and the bore 16 by means of a respective duct 20. A respective outlet orifice communicates with the bottom of the bore 16.

A reaction piston 24 is sealingly and slideably mounted in each bore 14. A corrector piston 26 of a type known pr se, the structure of which will not be descried in detail, is mounted slideably in each bore 16.

The corrector also comprises a respective rocker 28 designed to cooperate with the pistons 24 and 26 which project from the housing 12. A spring 30 is mounted on the end of the piston 26 projecting from the housing 12 and bears against the rocker 28, urging it towards a stop 32 on a bottom attached to the housing 12.

As shown in FIG. 3, the corrector comprises a hydraulic servo-control device 34 provided with two hydraulic inlets 36 and 38 connected independently of one another to the vehicle suspension (not shown). The two inlets are connected to a bore 40, in which two interacting aligned pistons 42 and 44 are sealingly and slideably mounted.

The bottom of the bore 40 communicates with the atmosphere by means of an outlet 46.

The corrector includes a hinge pin 48 capable of being displaced relative to the rockers 28, so as to vary the ratio of the corrector. According to the invention, the corrector comprises a reversible escape device 50 between the piston 44 of the hydraulic servo-control device and the hinge pin 48. The reversible escape device 50 comprises a first element 52 having a substantially conical end 54 and a shank 56. A connecting rod 58 is mounted pivotably by means of one of its ends on the shank 56, and its other end pivots on the pin 48. A spring 60 is mounted between a fixed stop 62 in the housing 12 and the conical part 54 of the first element 52 and urges the latter towards its position of rest shown in FIG. 3. A head 64 on the end of the piston 44 projecting from the bore 40 bears against the end 54 of the first element 52. The corrector also comprises a substantially U-shaped leaf spring 66, of which the central part of the U is mounted fixedly in the housing 12 and each arm 68 of the U is connected to a respective rocker 28. When the corrector is in its inactive configuration, the leaf spring 66 lifts the two rockers 28 to reduce the friction on the hinge pin 48.

Figure 4:
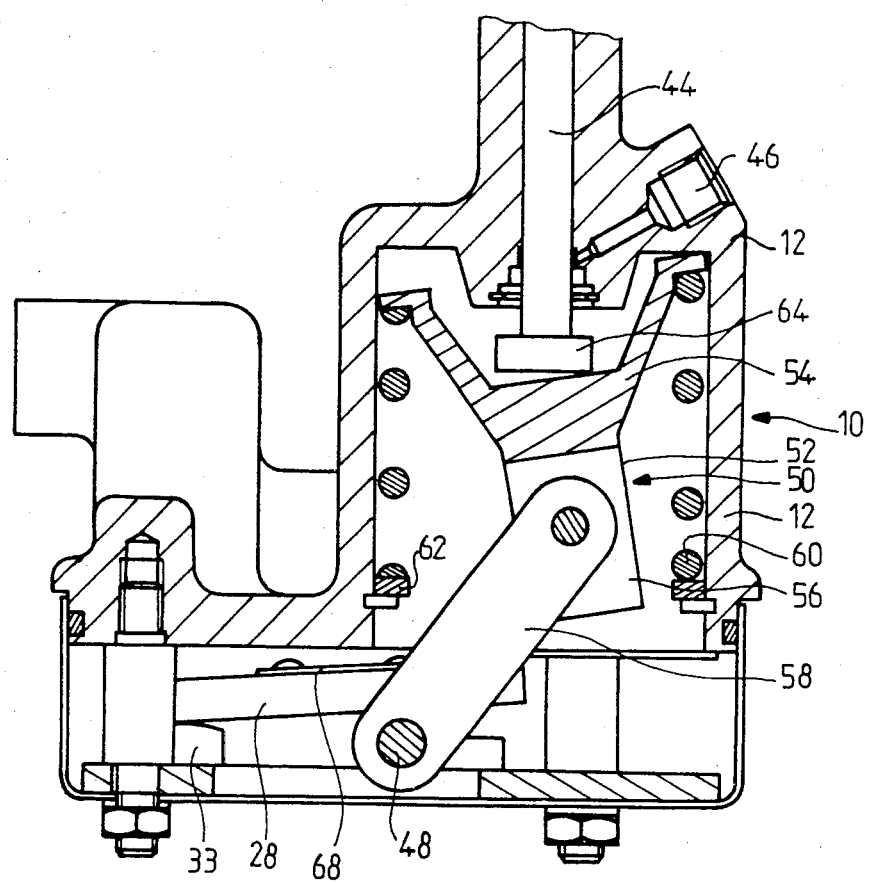
FIG. 4 is a sectional view similar to that of FIG. 3, showing the escape device in its escape position.

The corrector thus described operates in the following way. The hydraulic servo-control device moves downwards (looking at the drawings) against the force of the spring 60, causing the connecting rod 58 to rotate and the hinge pin 48 to be displaced to the left (looking at the drawings), because the latter is forced to slide on the bottom attached to housing 12. This displacement of the hinge pin 48 varies the ratio of the corrector according to the vehicle load. During sharp braking, the hydraulic pressure acting on the rocker 28 by means of the pistons 24 and 26 exerts a force on the hinge pin 48 tending to lock it. A subsequent variation in the vehicle load during braking, for example after a jolt, will move the piston 44 downwards. Since the hinge pin 48 is assumed to be locked, the reversible escape device 50 is displaced against the spring 60 and assumes the position shown in FIG. 4. The device 50 will resume its rest position under the effect of the spring 60 either when the brake is released or during the return of the hydraulic servo-control device 34. Damage to the device is thus completely prevented.

Another advantage of the arrangement of the reversible escape device is that the relationship between the load on the hydraulic servo-control device 34 and the slope of the brake distribution curve is linear.

I claim:

1. A variable ratio braking corrector for a vehicle, comprising a housing provided with at least two parallel bores, two pistons each mounted slideably in a respective bore, the two pistons projecting from the housing and cooperating with ends of a rocker mounted in an articulated manner relative to the housing, a hinge pin of the rocker displaceable by means of a mechanism connected to a vehicle suspension to vary the operational ratio of the corrector as a function of vehicle load, characterized in that the mechanism comprises a reversible escape device which includes at least two elements coupled pivotably to one another, one element coupled pivotably to the hinge pin and the other element biased toward a rest position by spring means, the mechanism comprising at least a third piston displaceable as a function of the vehicle load, and an end of the third piston engaging the other element, the other element displaceable by said third piston and, in said rest position, biased by the spring means toward a substantially axially aligned position with the third piston, the two pistons able to displace the rocker against the hinge pin so as to immobilize the hinge pin and prevent displacement thereof, the spring means and pivotable couplings of the two elements and hinge pin permitting the other element to be displaced by the third piston into nonalignment relative to the third piston and thereby prevent displacement of the hinge pin by the one element when the hinge pin is immobilized by said rocker, said spring means effecting a subsequent return of the other element to said substantially aligned position.

2. The braking corrector according to claim 1, characterized in that the other element comprises a substantially conical end on which the third piston and spring means bear, respectively.

3. The braking corrector according to claim 2, characterized in that the spring means bears on one side of the conical end of the other element and the third piston bears on the other side of the conical end of the other element.

4. The braking corrector according to claim 3, characterized in that the spring means seats the conical end on a housing portion disposed substantially orthogonally relative to the third piston so that alignment is effected thereby.

5. The braking corrector according to claim 4, characterized in that the spring means is disposed about the other element and permits the other element to tilt relative to the housing portion.

6. The braking corrector according to claim 5, characterized in that the third piston includes an end disposed within a recess of the conical end, the third piston able to displace the other element away from the housing portion.

7. The braking corrector according to claim 1, characterized in that the corrector comprises second spring means connected to the rocker and able to disengage the rocker from the hinge pin when the corrector is deactuated.

* * * * *